(12) United States Patent
Terashima

(10) Patent No.: US 6,259,900 B1
(45) Date of Patent: Jul. 10, 2001

(54) RADIO FREQUENCY SIGNAL FOLDING-BACK TRANSMITTING/RECEIVING CIRCUIT AND RADIO TRANSMITTING/RECEIVING APPARATUS FOR USE THEREWITH

(75) Inventor: Akiyoshi Terashima, Fukushima (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/271,037

(22) Filed: Mar. 17, 1999

(30) Foreign Application Priority Data

Mar. 18, 1998 (JP) .................................................. 10-068770

(51) Int. Cl.[7] .................................................. H04B 17/00
(52) U.S. Cl. .......................... 455/126; 455/115; 455/425; 455/67.1
(58) Field of Search .................. 455/67.1, 67.4, 455/67.5, 437, 434, 115, 425, 126

(56) References Cited

U.S. PATENT DOCUMENTS

| | | | |
|---|---|---|---|
| 3,665,507 | * | 5/1972 | Peil ....................................... 455/142 |
| 5,423,064 | * | 6/1995 | Sakata .................................. 455/437 |
| 5,442,811 | * | 8/1995 | Kobayashi et al. ................. 455/67.3 |
| 5,493,717 | * | 2/1996 | Schwarz ............................... 455/306 |
| 5,604,728 | * | 2/1997 | Jylhä ..................................... 370/241 |
| 5,937,336 | * | 8/1999 | Kumagai ............................. 455/126 |

FOREIGN PATENT DOCUMENTS

| | | | |
|---|---|---|---|
| 1-65539 | 4/1989 | (JP) | ............................... H04B/17/00 |
| 6152461 | 5/1994 | (JP) | ................................. H04B/1/38 |
| 6237229 | 8/1994 | (JP) | ............................... H04B/17/00 |
| 9700586 | 1/1997 | (WO) | ............................ H04B/17/00 |

OTHER PUBLICATIONS

Search Report dated Nov. 24, 2000.
Office Action Issued Jan. 8, 1999 by the Japanese Patent Office for the Counterpart Japanese Application and an English Translation Thereof.

* cited by examiner

Primary Examiner—William G. Trost
Assistant Examiner—Rafael Perez-Gutierrez
(74) Attorney, Agent, or Firm—Ostrolenk, Faber, Gerb & Soffen, LLP

(57) ABSTRACT

A radio frequency signal folding-back test circuit shifts a test transmission away from a normal transceiver frequency, and selects a test filter to receive the loop-back transmission. The test circuit is controlled by automatic logic which shifts a transmission frequency, causes the transmission to loop-back to the receiver, and connects an appropriate band pass filter to the receiver to obtain the test signal. The circuit provides a simple, automatic means for testing a transceiver without interfering with normal operation. The circuit avoids manual intervention to perform a test, and eliminates the need to shut down a remote transceiver while the test is performed.

6 Claims, 4 Drawing Sheets

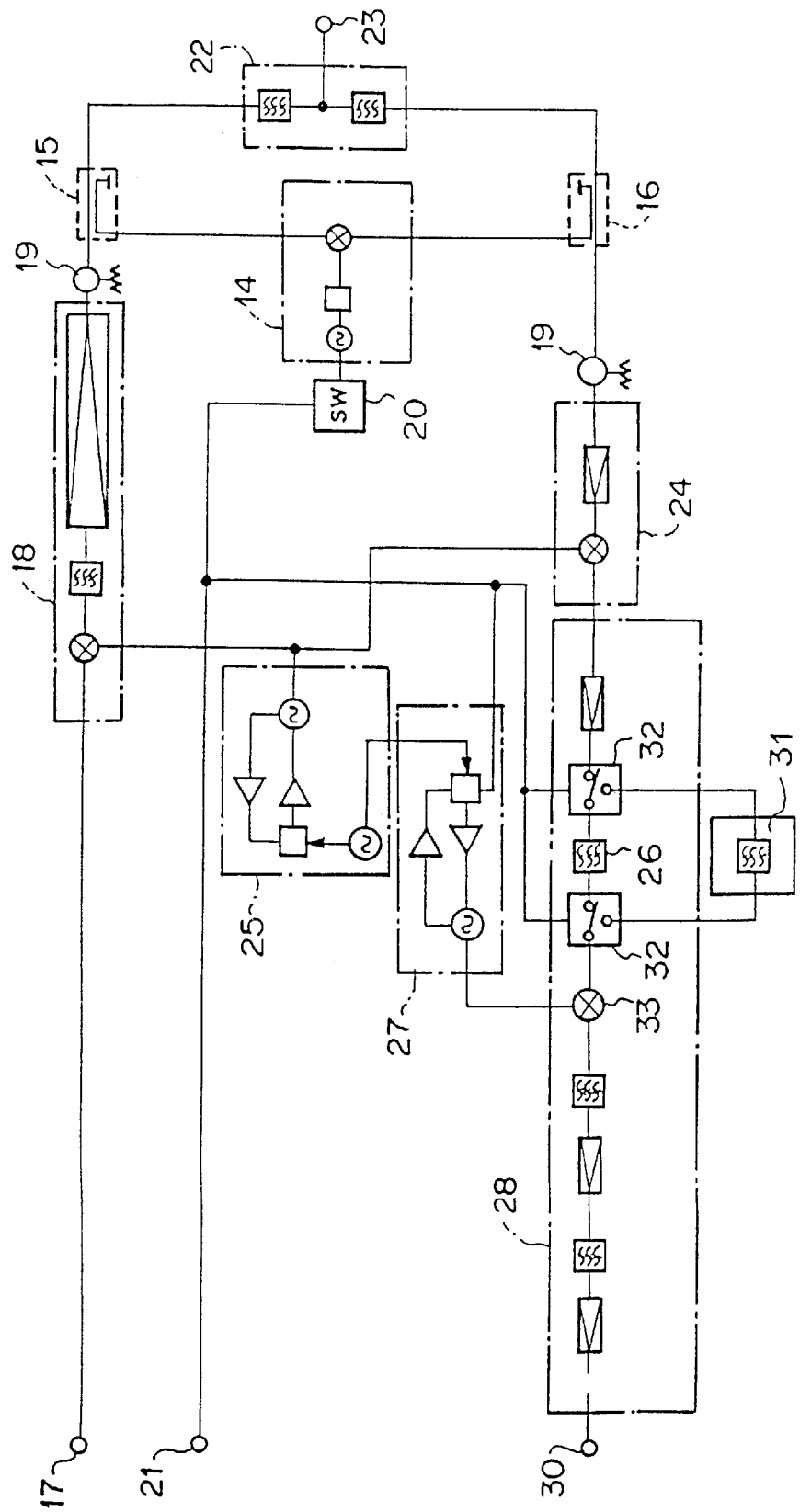
F I G. 3

RADIO FREQUENCY SIGNAL FOLDING-BACK TRANSMITTING/RECEIVING CIRCUIT AND RADIO TRANSMITTING/ RECEIVING APPARATUS FOR USE THEREWITH

BACKGROUND OF THE INVENTION

1. Field of the Invention

The present invention relates to a radio frequency signal folding-back transmitting/receiving circuit for testing the operation of a radio transmitting/receiving apparatus. The present invention also relates to a radio transmitting/ receiving apparatus having such a circuit.

2. Description of the Related Art

In recent years, to allow users to use a communication line at a low cost, it is desired to improve the efficiency of a maintenance operation periodically or non-periodically performed after a communication apparatus is installed. Thus, it is required to easily perform characteristic tests for the communication apparatus in the state in which it is operating.

FIG. 1 is a block diagram showing the structure of an opposite communication system having two radio transmitting/receiving apparatuses oppositely disposed. With reference to FIG. 1, an example of a system that allows a characteristic test to be effectively performed will be described.

Referring to FIG. 1, in a local station radio transmitting/ receiving apparatus 1, a multiplexed signal is input from, for example, a public telephone line to a local station transmission signal input terminal 10. A local station transmitter 3 amplifies the power of the multiplexed signal. A radio wave corresponding to the amplified signal is transmitted from an antenna through a local station branching filter 5. In addition, a local station receiver 4 receives a radio wave from the antenna 2 through the local station branching filter 5. For example, a multiplexed signal corresponding to a transmission signal is output from a local station reception signal output terminal 11.

On the other hand, referring to FIG. 1, in an opposite radio transmitting/receiving apparatus 6, a multiplexed signal is input from for example a public telephone line to an opposite station transmission signal input terminal 12. An opposite station transmitter 8 amplifies the power of the multiplexed signal. A radio wave is transmitted from an antenna 2 through an opposite station branching filter 7. In addition, an opposite station receiver 9 receives a radio wave from the antenna 2 through the opposite station branching filter 7. For example, a multiplexed signal corresponding to a transmission signal is output from an opposite station reception signal output terminal 13.

In the opposite communication system (in particular, a radio communication system using a microwave circuit routed nationwide), a transmission side telephone unit is connected to a reception side telephone unit through a transmission side subscriber line exchange, a microwave repeating station, a repeating exchange, and a reception side subscriber line exchange. The transmission side telephone unit transmits a signal of audio, data, video, or the like to the receiving side telephone unit through a designated telephone network. Thus, a radio repeating station is used as one important elements of the network.

Conventionally, an indoor radio transmitting/receiving apparatus and an outdoor antenna are connected with a waveguide capable of conducting a radio signal frequency of the equipment signal or the like. As the radio frequency rises, the power loss of the communication apparatus increases. In addition, installation cost of higher frequency increases. Thus, a transmission frequency converting portion and a reception frequency converting portion of the radio transmitting/receiving apparatus are disposed adjacent to the antenna to omit a connecting portion of waveguide. Consequently, the installation costs and power loss can be decreased.

In the opposite communication system of the radio transmitting/receiving apparatuses shown in FIG. 1, when a radio frequency signal folding-back test is performed for the local station radio transmitting/receiving apparatus 1, a radio frequency signal folding-back test circuit is disposed in the radio transmitting/receiving apparatus shown in FIG. 2A. In the radio frequency signal folding-back test circuit, a frequency shifter 14 is disposed between the local station antenna 2 and the local station radio transmitting/receiving apparatus 1 so as to perform a radio frequency signal folding-back test of the local station radio transmitting/ receiving apparatus 1. The frequency shifter 14 converts a transmission frequency into a reception, frequency.

In FIG. 2A multiplexed signal that is input to the local station transmission signal input terminal 10 is compared with a multiplexed signal that is folded back by the frequency shifter 14 to the local station reception signal output terminal 11. When the same multiplexed signal is correctly obtained, it can be determined that the local station radio transmitting/receiving apparatus is operating normally. When the same multiplexed signal is not correctly obtained, it can be determined that the local station radio transmitting/ receiving apparatus is abnormal. Once detected, a defective portion can be located and corrected.

However, in the folding-back test shown in FIG. 2A, the local station antenna 2 and the frequency shifter 14 must be manually mounted and dismounted. The folding-back test cannot be easily performed because of is manual nature. In addition, this type of test interrupts the transceiver operation.

Alternatively, in a folding-back test circuit for a radio transmitting/receiving apparatus is shown in FIG. 2B, a frequency shifter 14 is disposed in the local station transmitting/receiving apparatus 1. A transmission side directional coupler 15 is disposed between a local station transmitter 3 and a local station branching coupler 5. In addition, a reception side directional coupler 16 is disposed between a local station transmitter 3 and a local station branching filter 5. A signal is folded back from the local station transmitter 3 to the local station receiver 4 through the directional couplers 15 and 16. In this structure, it is not necessary to mount and dismount the local station antenna 2 and the frequency shifter 14. In addition, the same radio frequency signal folding-back test circuit (not shown) may be disposed in the opposite station radio transmitting/ receiving apparatus 6 shown in FIG. 2B.

However, in the structure shown in FIG. 2B, since a transmission signal of the opposite station radio transmitting/receiving apparatus 6 is always received, the output signal of the opposite station transmitter 8 should be turned off. In other words, to perform a radio frequency signal folding-back test for the local station radio transmitting/receiving apparatus 1, a transmission signal of the opposite station should be manually turned off. A manual turnoff is prescribed in case the opposite station receiver 9 becomes defective. If an automatic shutoff signal apparatus 6 gets defective, even if a signal that causes the off is transmitted from the local station radio transmitting/ receiving apparatus 1 to the opposite radio transmitting/ receiving apparatus 6 with a defective receiver 9, the output signal of the opposite station transmitter 8 cannot be turned off.

As an application of the folding-back test circuit shown in FIG. 2B, an attenuator is disposed between the local station branching filter 5 of the folding-back test circuit and the receiver side directional coupler 16. When a radio frequency signal folding-back test is performed, the attenuation amount of the attenuator is set to maximum value. Thus, the transmission signal of the opposite station radio transmitting/receiving apparatus 6 is not transmitted to the local station receiver 4.

In the radio frequency signal folding-back test method, since the insertion loss of the attenuator is large, noise figure (NF) as a performance index of the receiver deteriorates. When the attenuator is manually disposed, even if the insertion loss can be suppressed, the manual operation is required.

SUMMARY OF THE INVENTION

An abject of the present invention is to provide a radio frequency signal folding-back test apparatus for to perform frequency signal folding-back control testing signal without using the need to manually turn off a transmission signal of the opposite station.

In addition, since a reception signal is attenuated by a downstream circuit of the reception signal first converter, NF of the reception signal converter does not deteriorate. Even if a radio frequency signal folding-back function is added, the performance of the reception signal converter does not deteriorate.

A first aspect of the present invention is a radio frequency signal folding-back transmitting/receiving circuit for use with a radio transmitting/receiving apparatus, comprising a signal folding-back means for folding back a transmission signal of a local station to a radio frequency signal line of a receiver of the local station through a directional coupler, a first band-pass filter for allowing a reception signal that is output from an opposite station to pass, a second band-pass filter, connected to the first band-pass filter in parallel, for allowing a transmission signal whose frequency is different from the frequency of the reception signal to pass, and a selecting means for selecting the second band-pass filter when a radio frequency signal folding-back test is performed.

A second aspect of the present invention is a radio transmitting/receiving apparatus for transmitting/receiving a signal through a microwave circuit, comprising a signal folding-back means for inputting a transmission signal of a local station to a radio frequency line of a receiver of the local station through a directional coupler, a first band-pass filter and a second band-pass filter, connected in parallel, for allowing a reception signal received from a radio transmitting/receiving apparatus of an opposite station and a transmission signal whose frequency is different from the frequency of the reception signal, and a selecting means for selecting the first band-pass filter in normal state and for selecting the second band-pass filter in radio frequency signal folding-back test state.

According to the present invention, a frequency shifter disposed in a radio frequency signal folding-back transmitting/receiving circuit shifts the frequency of a transmission output signal of the local station by two channels or more in the channel allocation of the transmitting/receiving apparatus so as to treat a signal received from the opposite station as an out-of-band signal. Thus, a radio frequency signal folding-back test for the local station radio transmitting/receiving apparatus can be easily performed without need to manually turn off the output signal of the transmitter of the opposite station radio transmitting/ receiving apparatus.

In addition, an attenuating circuit is disposed after a reception signal converter rather than directly to an immediate receiver section, station branching filter 22 that most attenuates NF (noise), NF can be prevented from deteriorating.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 3 is a circuit diagram showing a radio transmitting/ receiving apparatus of the communication system according to the present invention.

Figure 1:
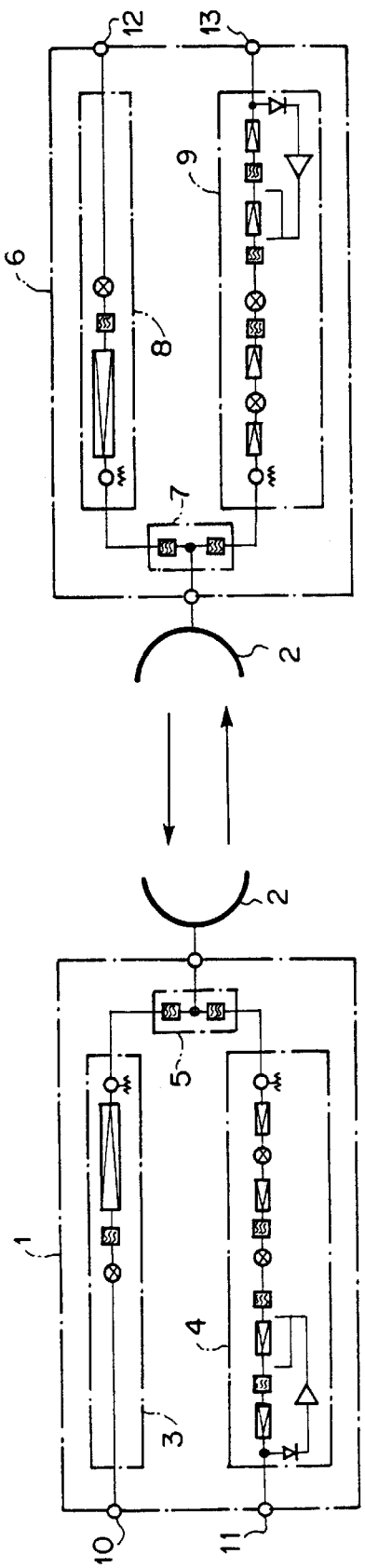
FIG. 1 is a circuit diagram showing opposite radio transmitting/receiving apparatuses of a communication system according to a conventional reference.
Figure 2A:
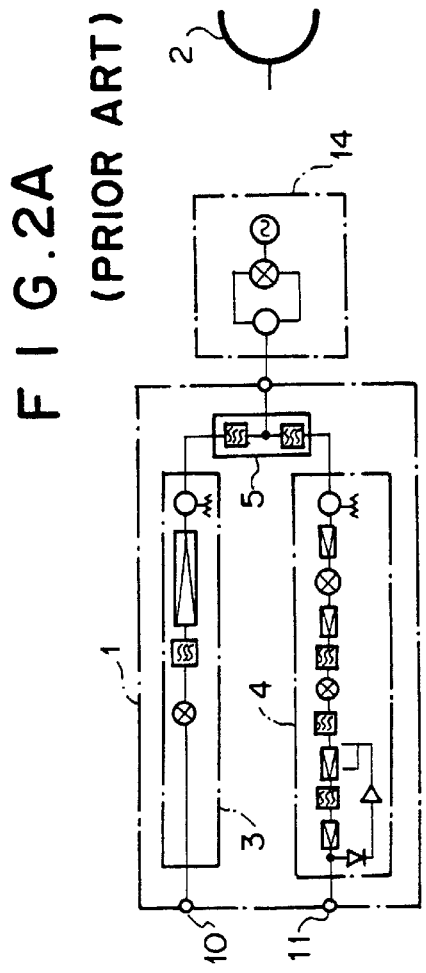
FIGS. 2A and 2B are a circuit diagrams showing opposite radio transmitting/receiving apparatuses of the communication system according to a conventional reference.
Figure 2B:
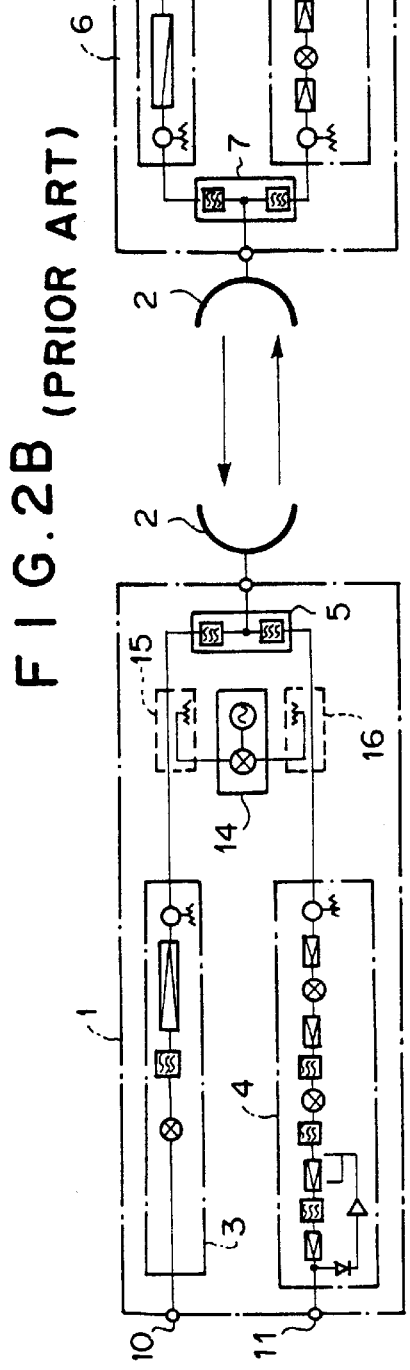

DESCRIPTION OF PREFERRED EMBODIMENTS (Structure of First Embodiment)

Referring now to FIG. 3, a radio frequency signal folding-back circuit according to a first embodiment of the present invention will be described.

A transmitting/receiving panel has ones transmission signal converter and two reception signal converters. A transmission signal converter is a transmission signal converter 18 converts a transmission intermediate frequency signal that is input to a transmission intermediate frequency signal input terminal 17 into a radio frequency signal. The two reception signal converters are a reception signal first converter 24 and a reception signal second converter 28. The reception signal first converter 24 converts a radio frequency signal that is input from an opposite station into an intermediate frequency signal.

The transmitting/receiving panel also has a common first local oscillator 25, a reception signal second local oscillator 27, and a branching filter 22 to convert the frequency of a signal into another frequency. The common first local oscillator 25 is used in common with the transmission signal converter 18 and the reception signal first converter 24. The reception signal second local oscillator 27 is used for the reception signal second converter 28. The branching filter 22 prevents an unnecessary frequency signal from being transmitted. In addition, the branching filter 22 extracts a desired frequency signal from a transmitting/receiving panel radio frequency signal input/output terminal 23 connected to an antenna (not shown).

In addition, the transmitting/receiving panel has a transmission side directional coupler 15, a frequency shifter 14, and a reception side directional coupler 16 so as to perform a radio frequency signal folding-back test. The transmission side directional coupler 15, the frequency shifter 14, and the reception side directional coupler 16 fold back a transmission signal of the local station as a reception signal to the local station reception signal converters 24 and 28.

In addition, the transmitting/receiving panel has an opposite transmission signal attenuating circuit BPF 31 that attenuates an opposite station transmission signal received as a reception signal of the local station. The opposite station transmission signal attenuating circuit BPF 31 is disposed in parallel with the reception signal second converter. Only when a radio wave folding-back test is performed, radio frequency signal switches 32 disposed on both sides of the BPF 31 cause the BPF 31 to pass a reception signal.

In the normal state, a transmitting portion of the local station and a receiving portion of the local station operate independently. In the transmitting portion, a transmission intermediate frequency signal that has been modulated with a transmission signal is supplied to the transmission intermediate frequency signal input terminal 17. The transmission signal converter 18 mixes the transmission intermediate frequency signal with a local oscillation frequency signal oscillated by the common first local oscillator 25. The resultant signal is amplified through a band-pass filter. The amplified transmission signal is output from the transmitting/receiving panel radio frequency signal input/output terminal 23 connected to an antenna system through an isolator 19, the transmission side directional coupler 15, and the branching filter 22. The isolator 19 remove a disturbance signal that is input from the, antenna system. The local oscillation frequency signal oscillated by the common first local oscillator 25 is obtained by a PLL circuit that synchronizes with a reference oscillation frequency. A transmission frequency component that is inductively coupled by the transmission side directional coupler 15 is not used because the radio frequency signal folding-back operation switch is turned off.

On the other hand, in the receiving portion, a radio frequency reception signal that is input to the transmitting/receiving panel radio frequency signal input/output terminal 23 through the antenna system is input to the reception signal first converter 24 through the branching filter 22, the reception side directional coupler 16, and the isolator 19 that removes a radio frequency transmission signal that is input from the transmitting portion. The reception signal first converter 24 mixes the radio wave reception signal with a local oscillation frequency signal oscillated by the common first local oscillator 25 and obtains a reception first intermediate frequency component. The reception first intermediate frequency component is input to the reception signal second converter 28.

In the reception signal second converter 28, the reception first intermediate frequency signal is supplied to a mixer 33 through a buffer, radio frequency signal switches 32, and a band-pass filter 26. The radio frequency signal switches 32 selects the band-pass filter 26 or the band-pass filter 31. The mixer 32 mixes the reception first intermediate frequency signal with the local oscillation frequency signal oscillated by the reception signal second local oscillator 27 as the PLL circuit in synchronization with the reference oscillation frequency and obtains the reception second intermediate frequency component. The reception second intermediate frequency component is supplied to an intermediate frequency amplifying circuit. The intermediate frequency amplifying circuit amplifies the reception second intermediate frequency signal. An Automatic Gain Control (AGC) circuit maintains the level of the amplified signal. An output signal of the AGC circuit is supplied to a reception intermediate frequency signal output terminal 30.

When a radio frequency signal folding-back test is performed, a high frequency signal folding-back control signal 21 causes a radio frequency signal folding-back operation switch 20 to be turned on. Thus, the frequency shifter 14 shifts the frequency of the transmission signal supplied from the transmission side directional coupler 15 by for example two channels. The reception side directional coupler 16 induces the resultant signal to the reception system. Thus, the resultant signal is input to the reception signal first converter 24 through the isolator 19. In the above-described normal state, the radio frequency signal folding-back operation switch 20 is turned off. Unless the radio frequency signal folding-back test is performed, a transmission signal of the local station is not input to the reception signal first converter 24.

The reception signal first converter 24 down-converts both a transmission signal that is input to the reception signal first converter 24 and a reception signal as a transmission signal of the opposite station into first intermediate frequency signals.

The radio frequency signal folding-back control signal 21 causes the radio frequency signal switches 32 to connect the, reception signal first converter 24 and the BPF 31. The center frequency of the BPF 31 is apart from the center frequency of the BPF 26 by two channels. Thus, a folded signal of the local station that passes through the BPF 31 does not attenuate. On the other hand, in the normal state rather than the folding-back test state, a folded signal of the local station that passes through the BPF 26 of the reception signal second converter 28 does not attenuate. In the folding-back test state, the BPF 31 attenuates a transmission signal of the opposite station (not shown).

To cause a folded reception signal whose frequency is apart by two channels from the frequency of a transmission signal of the local station to be output from the reception intermediate frequency signal output terminal 20 as a predetermined reception second intermediate frequency signal, the radio frequency signal folding-back control signal 21 causes the frequency of the reception signal second local oscillator 27 to be shifted by two channels. Thus, the mixer 33 of the reception signal second converter 28 converts a folded intermediate frequency signal that has been shifted by two channels as a transmission signal of the local station into a predetermined reception intermediate frequency signal.

When a radio frequency signal folding-back test is performed, a transmission signal of the local station that is input from the transmission intermediate frequency signal input terminal 17 is transmitted as a predetermined reception intermediate frequency signal from the reception intermediate frequency signal output terminal 30. The frequency of a reception signal of the local station as a transmission signal of the opposite station is shifted by two channels from the frequency of a transmission signal of the local station. In addition, the level of the reception signal of the local station is lower than the level of the folded signal as the transmission signal of the local station. Thus, the radio frequency signal folding-back test can be performed without deterioration of transmission characteristics.

In the embodiment, the difference between the transmission frequency and the reception frequency is two channels. However, the difference between the transmission frequency and the reception frequency is not limited to two channels as long as frequencies are separated by the band-pass filters 26 and 31. Particularly, in a radio frequency signal folding-back test, when a narrow-band test radio frequency signal is used for a transmission signal, with a band-pass filter that passes the transmission signal, the radio transmitting/receiving apparatus can be easily tested. However, such a structure is not applied when a wide-band transmission signal is tested.

In the embodiment, input/output signals of the local station radio transmitting/receiving apparatus are intermediate frequency signals. However, an original signal shown in FIG. 1 may be used. When the original signal is composed with a folded signal thereof in a radio frequency signal folding test, each circuit of the radio transmitting/receiving apparatus can be tested.

Figure 4:
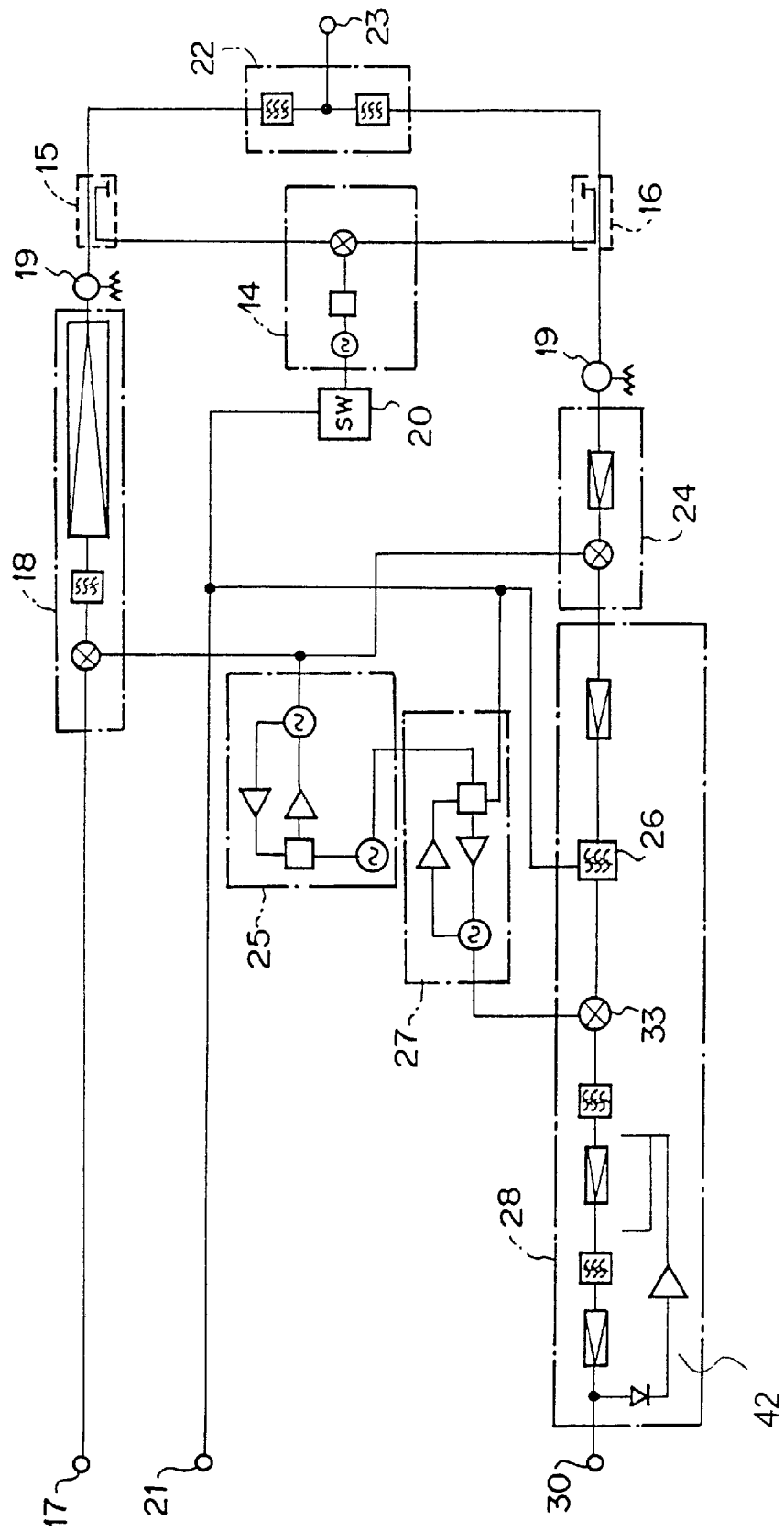
FIG. 4 is a circuit diagram showing a radio transmitting/ receiving apparatus of the communication system according to the present invention.

Referring now to FIG. 4, in a radio frequency signal folding-back test, as a means for attenuating a reception signal of the local station as a transmission signal of the opposite apparatus, a f0 variable Band-Pass filter (BPf) 42 that varies f0 with an electric signal is used. The above arrangement results in a simplified structure. The variable BPF 32 is composed of a radio frequency operational amplifier, which is formed with a pin diode and capacitors disposed both sides of the pin diode. By vary the resistance of the pin diode with a bias voltage, the pass band can be varied. However, the present invention is not limited to the f0 variable BPF 42. In other words, another variable BPF can be used.

Referring to FIG. 4, in the normal state, the variable BPF 42 of the reception signal second converter causes a radio frequency reception signal of the opposite transmitter to pass. In the radio frequency signal folding-back test, the variable BPF 42 causes a down-converted transmission frequency component to pass. The variable BPF 42 is composed of a radio frequency operational amplifier. By varying the resistance of the pin diode with a bias voltage, the pass band can be varied.

In a radio frequency signal folding-back test, the radio frequency signal folding-back circuit shown in FIG. 4 compares a transmission intermediate frequency component that is input from the transmission intermediate frequency signal input terminal 17 with the output signal of the reception intermediate frequency signal output terminal of the reception signal second converter 28 and determines whether or not there is an error, whether or not a delay time period is proper, and whether or not the output level is proper.

According to the present invention, a radio frequency signal folding-back test for the radio transmitting/receiving apparatus of the local station can be easily performed by the radio transmitting/receiving apparatus of the local station using a radio frequency signal folding-back control signal without need to manually turn off a transmission signal of the opposite station.

In addition, since a reception signal corresponding to a transmission signal of the opposite station is attenuated by a downstream circuit of the reception signal first converter, NF of the reception signal converter does not deteriorate. Even if a radio frequency signal folding-back function is added, the performance of the reception signal converter does not deteriorate.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A radio transmitting/receiving apparatus for transmitting/receiving a signal through a microwave circuit, comprising:

a signal folding-back circuit for inputting a transmission signal with a frequency different from that of said radio transmitting/receiving apparatus to a radio frequency line of a receiver of said radio transmitting/receiving apparatus through a directional coupler;

a first band-pass filter and a second band-pass filter, connected in parallel, for passing a reception signal received from another radio transmitting/receiving apparatus and a transmission signal with a frequency different than a frequency of said reception signal, respectively;

a filter selector for selecting said first band-pass filter in a normal state and for selecting said second band-pass filter in a radio frequency signal folding-back test state;

wherein a transmission side directional coupler receives a transmission signal of a local station, wherein a frequency shifter converts the frequency of the transmission signal, wherein a reception side directional coupler inputs an output signal of the frequency shifter to a radio frequency line of the receiver of the local station, and wherein said second band-pass filter passes the transmission signal through a reception signal first converter.

2. A radio frequency signal folding-back transmitting/receiving circuit for use with a radio transmitting/receiving apparatus, comprising:

a signal folding-back circuit for folding back a transmission signal with a frequency different than a transmission frequency of said radio transmitting/receiving apparatus to a radio frequency signal line of a receiver of said radio transmitting/receiving apparatus through a directional coupler;

a first band-pass filter for allowing a reception signal that is output from an opposite radio transmitting/receiving apparatus to pass;

a second band-pass filter, connected to said first band-pass filter in parallel, for allowing a transmission signal with a frequency different than a frequency of said reception signal to pass;

a filter selector for selecting said second band-pass filter when a radio frequency signal folding-back test is performed;

wherein a transmission side directional coupler receives a transmission signal of the local station, wherein a frequency shifter converts the frequency of the transmission signal, and wherein a reception side directional coupler inputs an output signal of the frequency shifter to a radio frequency line of the receiver of the local station.

3. The radio frequency signal folding-back transmitting/receiving circuit as set forth in claim 2 wherein the radio transmitting/receiving apparatus transmits the transmission signal from an antenna in normal state, and wherein said first band-pass filter demodulates the reception signal of the opposite station through the antenna.

4. A radio frequency signal folding-back transmitting/receiving circuit for use with a radio transmitting/receiving apparatus, comprising:

a signal folding-back circuit for folding back a transmission signal with a frequency different than a transmission frequency of said radio transmitting/receiving apparatus to a radio frequency signal line of a receiver of said radio transmitting/receiving apparatus through a directional coupler;

a first band-pass filter for allowing a reception signal that is output from an opposite radio transmitting/receiving apparatus to pass;

a second band-pass filter, connected to said first band-pass filter in parallel, for allowing a transmission signal with a frequency different than a frequency of said reception signal to pass;

a filter selector for selecting said second band-pass filter when a radio frequency signal folding-back test is performed;

wherein said first band-pass filter and said second band-pass filter are variable band-pass filters for allowing frequencies of signals to be varied.

5. The radio frequency signal folding-back transmitting/receiving circuit as set forth in claim 4 wherein the radio transmitting/receiving apparatus transmits the transmission signal from an antenna in normal state, and wherein said first band-pass filter demodulates the reception signal of the opposite station through the antenna.

6. A radio transmitting/receiving apparatus for transmitting/receiving a signal through a microwave circuit, comprising:

a signal folding-back circuit for inputting a transmission signal with a frequency different from that of said radio transmitting/receiving apparatus to a radio frequency line of a receiver of said radio transmitting/receiving apparatus through a directional coupler;

a first band-pass filter and a second band-pass filter, connected in parallel, for passing a reception signal received from another radio transmitting/receiving apparatus and a transmission signal with a frequency different than a frequency of said reception signal, respectively;

a filter selector for selecting said first band-pass filter in a normal state and for selecting said second band-pass filter in a radio frequency signal folding-back test state;

wherein said first band-pass filter and said second band-pass filter are variable band-pass filters for allowing frequencies of signals to be varied.

\* \* \* \* \*